United States Patent Office 3,014,079
Patented Dec. 19, 1961

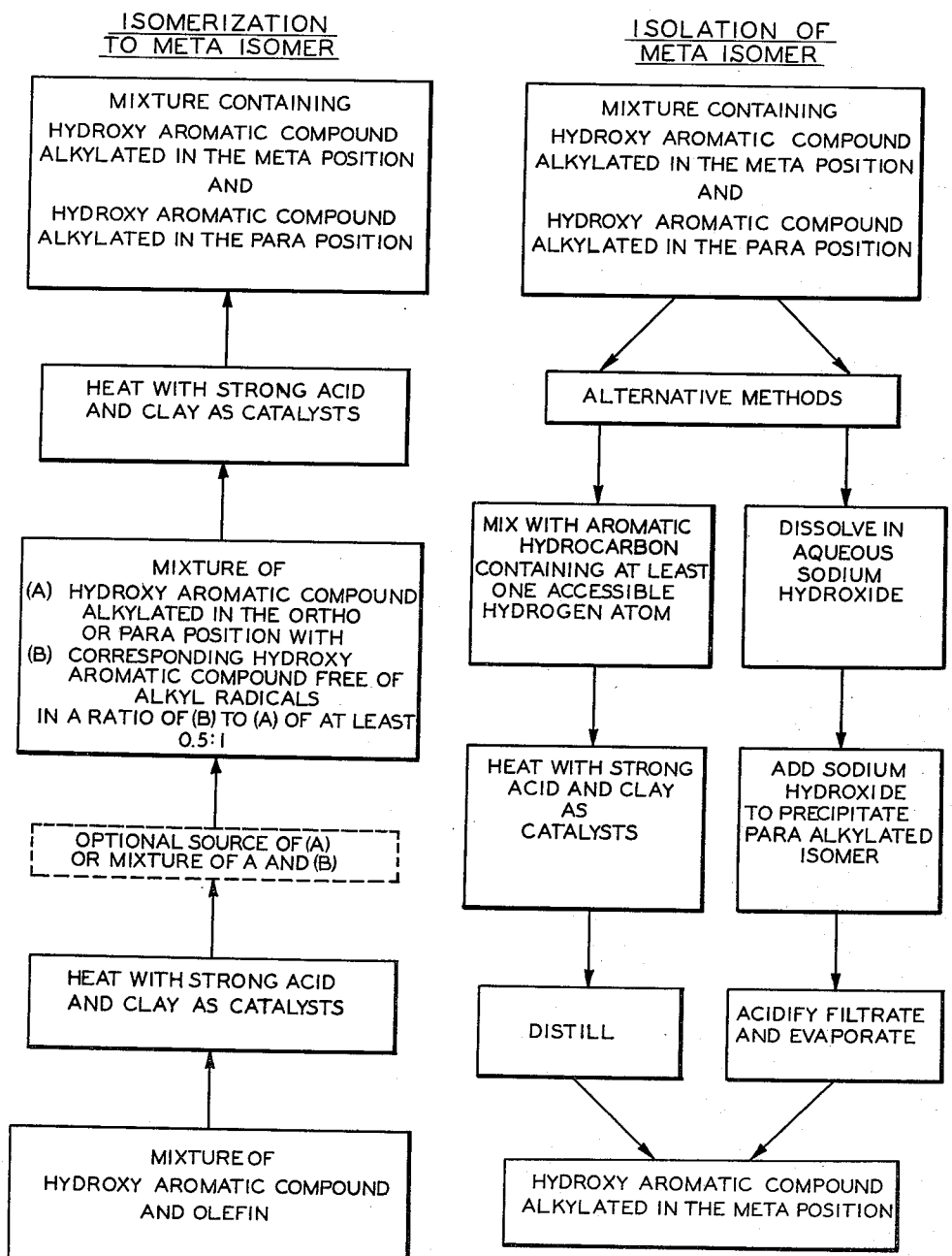

3,014,079
PROCESS FOR PREPARING META-ALKYLPHENOLS
John F. Olin, Kettering, Ohio, assignor to Pennsalt Chemicals Corporation, Philadelphia, Pa., a corporation of Pennsylvania
Filed Feb. 21, 1958, Ser. No. 716,564
11 Claims. (Cl. 260—624)

The present invention relates to the manufacture of alkylated aromatic compounds having at least one hydroxy radical substituted for a nuclear hydrogen atom, and more particularly relates to a method for obtaining meta-alkyl-substituted hydroxy aromatic compounds and especially meta-alkylphenols.

The synthesis of alkylphenols by the alkylation of phenol with an olefin in the presence of catalysts such as sulfuric acid or aluminum chloride as described in the literature results primarily in ortho- and para-positioned alkyl groups. Heretofore, the synthesis of meta-alkylphenols has involved a long, multi-step, expensive procedure. Meta-substituted phenols are present in low concentrations in certain mixtures of alkylphenol isomers derived from natural sources, such as coal tar distillation products, or coal hydrogenation products, but they are extremely difficult to isolate therefrom. While the ortho isomer of an alkylphenol is ordinarily easy to separate from the para isomer in a mixture thereof, by distillation, the meta and para isomers of alkylated hydroxy aromatic hydrocarbons generally have close boiling ranges, and their separation cannot be effected by fractionation. Various methods have been proposed hitherto for the separation of meta- and para-alkylphenols, but these generally involve multi-stage extraction, conversion of the desired compound to a derivative from which it must be recovered by further reaction, and similar laborious, expensive procedures.

For many purposes, meta-alkylated aromatic hydroxy compounds, if available, are more desirable than the ortho or para isomers, and improved products may be formulated from the meta-substituted alkylphenols. The m-cresol resins, for example, are quicker drying and lower temperature curing and have other unique properties such as superior chemical, soap and alkali resistance. As less hindrance is encountered in the meta-alkylphenols, normal reactions can be obtained from the hydroxyl group with particular facility; for example, there may be prepared organic and inorganic esters, ethylene oxide adducts for surface active agents, and other reaction products involving the hydroxyl group. Meta-alkylphenol derivatives are useful as rubber and oil anti-oxidants, vulcanizing agents, miticides and plastics intermediates. The biological activity of derivatives of meta-tert-butylphenol as cholinesterase inhibitors is many times greater than can be obtained from either o- or p-tert butylphenol.

It is an object of this invention to provide a process for preparing meta-alkylphenols.

It is a further object to provide a process for preparing meta-alkylphenols whereby the product of the catalytic alkylation of phenol is converted to a meta-alkylphenol.

Another object of this invention is to provide a process whereby meta-alkylphenols may be separated from the corresponding para-alkylphenol isomers.

These and other objects are accomplished as described hereinafter.

In accordance with this invention, meta-alkylated hydroxy aromatic compounds are provided by heating an alkylated hydroxy aromatic compound wherein the position of the alkyl substituent is selected from the ortho and the para positions, with the corresponding unalkylated hydroxy aromatic compound in the presence of a strong acid and clay.

In a further embodiment of this invention, the separation of a meta-alkylated hydroxy aromatic compound from the corresponding para-alkyl isomer is accomplished as further described in detail hereinafter.

Reference may be made to the drawing which illustrates the sequence of process steps.

The present invention is particularly applicable to the manufacture of substituted phenols and especially applies to the preparation of meta-alkylphenols from alkylphenols wherein the alkyl group is in the ortho or para position and contains from 2 to 12, preferably from 2 to 6, carbon atoms.

One class of preferred starting materials for use in the preparation of meta-alkylphenols in accordance with the present invention comprises para-alkylphenols. Illustrative of presently useful para-alkylphenols are the para isomers of ethylphenol, t-butylphenol, t-amylphenol, cyclohexylphenol, t-hexylphenol, isohexylphenol, octylphenol, (dimethyl cyclohexyl) phenol, nonylphenol, decylphenol, dodecylphenol, and the like. Particularly preferred in the present invention are phenols substituted by tertiary-alkyl groups, in which the carbon atoms by which the alkyl groups are attached to the aromatic nucleus are free of hydrogen atoms. Tertiary-alkyl groups are generally advantageously derived by alkylating phenol with a branched-chain olefin, for example, by alkylating phenol with olefins such as isobutylene, isoamylene and the like, or with olefin dimers and trimers such as diisobutylene, tripropylene, triisobutylene, tetrapropylene, and so forth.

Para-alkylphenols are commercially prepared by alkylation of phenol with an olefin in the presence of a catalyst, which is usually sulphuric acid. As is well understood in the art, the initial product of this condensation of an olefin and phenol in the presence of sulphuric acid apparently comprises an ether, which rearranges to ortho-alkylphenol and para-alkylphenol, on digestion. The reaction product of the alkylation may thus comprise this olefin-phenol ether, ortho-alkylphenol, para-alkylphenol, and to some extent, dialkylphenol, as well as any unreacted phenol. When the alkylation product is digested in the presence of an isomerization catalyst at a higher temperature, or when the reaction itself is carried out at higher temperatures than required for simple olefinphenol condensation, for example up to about 100° C., an increasing proportion of para-alkylphenol is obtained. Activated clay is a catalyst of the isomerization of ortho- to para-alkylphenol.

In accordance with this invention, instead of a para-alkylphenol, the reaction product prepared by alkylating phenol with an olefin in the presence of a strong acid may be employed for the preparation of meta-alkylphenols. Such a product of the alkylation of phenol may comprise any one or more of the above listed reaction mixture components, that is, an ether, an ortho-, para-, or di-alkylphenol, which may act as para-alkylphenol precursors, and the alkylation of the phenol may be more or less closely conjoined to the conversion of the alkylation product to meta-alkylphenol by the process of this invention. The reaction mixture prepared by alkylation constitutes a preferred starting material in this invention and will be referred to in the following description.

It is preferred, in the embodiment of this invention which comprises the initial alkylation of phenol to produce an alkylation product which is employed as a source of the meta-isomer, to conduct the alkylation only to a degree at which a part of the phenol remains unalkylated. As noted above, the para-alkyl hydroxy aromatic compound is heated with the corresponding unalkylated aromatic compound to produce meta-alkyl compounds by the process of the invention; accordingly, by incomplete alkylation of the phenol, a reaction mixture suitable for direct continuation of the process to form meta-alkylphenol is obtained. However, if desired, all of the phenol in the initial reaction mixture may be alkylated, and extra phenol may subsequently be added prior to isomerization to meta-alkylphenol.

If the production of the meta-alkylphenol is to be preceded by alkylation of phenol, the first step in the present process comprises mixing the olefin with the phenol compound with which it is to be condensed, these ingredients being thoroughly agitated in the presence of an acid catalyst until initial condensation takes place to produce a mixture containing unchanged phenol, ortho-alkylphenol, di-alkylphenol, the ether formed by condensation of the unsaturated hydrocarbon with the phenol, and para-alkylphenol. Preferably clay, desirably in activated form, is present as a co-catalyst during the alkylation. The optimum alkylation temperature is generally below 100° C. Lower temperatures of reaction (around 40 or 50° C. or lower) favor the formation of ortho-alkylphenol, while higher temperatures, up to about 100° C., favor the formation of the para compounds.

After the initial condensation reaction has proceeded to such a point that a portion of the phenol has been converted into ortho-alkylphenol, ethers, and other phenolic derivatives as discussed above, with or without interposition of a digestion step in which the olefin-phenol condensation product is converted to para-alkylphenol by heating the reaction mixture at about 100° C., the isomerization of the phenolic constituents of the reaction mixture to produce meta-alkylphenol is next accomplished by heating the reaction mixture together with strong acid and clay at a more elevated temperature for a time sufficient to produce formation of the meta isomer. The temperature employed in this step may range from about 125° C. up to below the decomposition temperature of the reaction components. It is preferably between about 140° and 200° C. Generally, this isomerization will conveniently be conducted at atmospheric pressure, although sub- or superatmospheric pressures may be employed if desired. The reaction time necessary to accomplish the isomerization may vary widely, depending on the reactants employed and apparatus used; generally from 4 to 24 hours are required to produce maximum conversion. Before the isomerization, the mounts of acid and clay present in the reaction mixture are adjusted if required, and a further quantity of phenol is added to the reaction mixture if necessary, to produce the desired ratio of phenol to alkylphenol. The molar ratio of phenol to para-alkyl-substituted phenol in the isomerization stage can be as low as 0.5:1; however, a ratio of at least about 1:1 and desirably a higher ratio, up to about 3:1 is preferred, to minimize the formation of di-substituted phenols, and higher ratios can be used if economic considerations warrant.

The clay employed as a catalyst in the practice of the invention may be a natural or synthetic aluminosilicate. Generally a clay of the montmorillonite type, comprising oxides of magnesium and of aluminum combined with silica, will be preferred. A typical clay of the montmorillonite class will comprise, for example, 40–55% $SiO_2$, 0.13–20% $Al_2O_3$, 0.05–25% MgO, 0.03–29% $F_2O_3$, up to 23% ZnO, up to 3% CaO, 0.04–3% $Na_2O$, and traces of $K_2O$ and MnO. The clay will desirably be activated. As is known in the art, clays of the subbentonite type such as montmorillonite are usually activated by treatment with a strong acid. Activation improves the catalytic and adsorbent properties of the clay. Activated clays are well known in the chemical industry; illustrative of such clays useful in the process of the invention are, for example, "Retrol" clay, "Tonsil" clay, and the like. An activated clay such as "Retrol" clay, which infra-red analysis shows to contain oxides of Fe, Al, Ti, Mg, Si and Ca, represents a preferred material for use in the present process. For the present purposes, the clays are preferably substantially free of physically bound water; drying at 100–150° C. for a few hours usually produces satisfactory results. The amount of clay employed may vary from 3% to 30% by weight, calculated on para-substituted phenol or precursors thereof present in the reaction mixture. A quantity of 20–25% by weight of clay with reference to alkylphenol is preferred.

While the invention may be practiced, in most cases in which an acid catalyst is used in the initial condensation, by retaining the acid catalyst after addition, if necessary, of clay prior to raising the temperature of the alkylation mixture for the isomerization step, the acid catalyst may be neutralized and removed between these two steps if desired. In some cases, it will be desirable to remove at least a part of the acid catalyst by washing or neutralization prior to isomerization. This is especially true in connection with the manufacture of secondary alkyl phenols by condensation of straight chain olefins with phenol, since in this reaction, it may be advantageous to use as much as 10% of sulphuric acid in the initial condensation reaction, and it may then become desirable to remove a part of this acid before performance of the isomerization step.

It is not necessary that the same acid be used in the isomerization step as that employed in the initial condensation step, but it is desirable that a small proportion of acid be present along with the clay to effect the isomerization. While amounts of acid varying between 0.5 and 7% based on the weight of the alklyphenol may be employed in this isomerization, the best results have been attained in cases in which the acid concentration amounts to at least 1% to 1.5%. It is ordinarily undesirable that an amount of sulphuric acid in excess of 7% be present in the isomerization step, since large excesses of acid result in loss of product due to sulphonation. An amount of free sulphuric acid in excess of 1.5% will ordinarily be unnecessary at this stage of the reaction.

While I do not wish to be limited by any theory as to the reasons for the results attained in the practice of the invention, the clay and sulphuric acid appear to exert a co-catalytic effect in accomplishing the isomerization. In case relatively small quantities of acid are used in this isomerization step, the acid tends to disappear during the course of the isomerization. This is not entirely understood, but it is believed to be due partly to adsorption of the acid on the clay. Regardless of the cause of this phenomenon, however, the filtrate obtained after removal of the clay is practically neutral, and only small traces of alkali are required to throw the filtrate to the basic side.

While the invention has been discussed above principally with reference to the use of sulfuric acid, other acids capable of catalyzing alkylation of phenols may be employed either in the initial condensation step or in the subsequent isomerization step. Thus, hydrochloric acid, phosphoric acid, hydrofluoric acid, toluenesulphonic acid or other strong acid catalysts or equivalent acidic substances may be substituted for sulphuric acid in the practice of the process.

In the manufacture of alkylphenols by condensing olefins containing four or more carbon atoms with phenol, it is frequently desirable to employ mixtures of branched chain olefins with straight chain olefins in the condensation reaction, and to produce tertiary-alkylphenols to the exclusion of the secondary-alkylphenols which would be formed by condensation of the straight chain olefins with the phenol. In such cases, the selective condensation of the branched chain olefins with the phenol may be accomplished by appropriate control of the temperature, quantity of catalyst, and time of the initial condensation reaction. By proper control of the reaction, the condensation of the straight chain olefin content of the initial olefin mixture with the phenol may be substantially completely avoided. After the branched chain olefin has been selectively condensed with the phenol in this manner, the straight chain olefin content of the mixture (for example, the pentene-2 in the manufacture of tertiary-amylphenol) is removed from the reaction mixture prior to the performance of the isomerization step. Thus, after dilution of the intermediate reaction mixture with water, the straight chain olefin may be removed from the mixture by distillation overhead together with a part of the water. There will then be left in the distillation apparatus a residue consisting of an oily phenolic layer containing the intermediate condensation reaction mixture which is later to be isomerized, together with a small water layer as a lower stratum. After removal of this water stratum and drying, the phenolic reaction mixture may be isomerized by addition of acid and clay and treatment as discussed above.

When straight chain olefins or cyclic olefins are condensed with hydroxy aromatic compounds in the practice of the invention, it will ordinarily be desirable to use substantially larger quantities of catalyst and more intense reaction conditions than those indicated above for the manufacture of tertiary-alkyl derivatives.

While the invention has been discussed above with reference to a reaction product obtained by condensation of olefin with phenol, the process of the present invention is not limited to such starting materials. Thus, for example, intermediate reaction products obtained by condensation of alcohols or alkyl halides with phenol may also be converted to meta-alkylphenols by treatment with clay and acids in the practice of the process. Any of the individual para-alkylphenol precursors present in alkylation products, such as the aforementioned ether, ortho-alkylphenol or dialkylphenol may be employed separately for meta isomer preparation. The present process goes with particular facility and produces high yields of meta-alkylphenols when applied to a mixture of phenol and para-alkylphenol.

For production of para-alkylphenol, the alkylation of phenol may be conducted at an elevated temperature, which may be about 90° to 100° C., in the presence of an isomerization catalyst such as activated clay, and the resulting p-alkylphenol may be separated by fractionation. Alternatively, the product of acid-catalyzed condensation of equimolar quantities of olefin and phenol may be digested at about 100° C. in the presence of an ortho-alkylphenol isomerization catalyst to produce para-alkylphenol which, on admixture with phenol and heating with clay and acid at a more elevated temperature as hereinbefore indicated, can be converted in turn to the meta isomer. It is likewise possible to obtain para-alkylphenols useful as starting materials in the present process by other procedures.

It is to be noted that my investigation has disclosed that the phenols alkylated with di- or poly-isoalkyl olefins such as diisobutylene undergo cleavage at the temperatures of isomerization; and the meta-alkylphenol obtained is a phenol alkylated in the meta-position, not with the dimer of the olefin, but with a tertiary-alkyl group corresponding to the monomeric olefin. In the present invention, accordingly, it is particularly preferred to isomerize phenol alkylated with an olefin of up to 6 carbon atoms when such olefin forms a teritiary alkyl radical, but the process is not limited thereto.

The products of isomerization of a para-alkylphenol or percursor thereof in accordance with the present process comprise a mixture of meta- and para-alkylphenol isomers in varying proportions, together with other reaction mixture components such as phenol. At the conclusion of the isomerization step, if desired, the meta- para-alkylphenol mixture may be separated from the remainder. To accomplish this separation, the clay is removed from the reaction mixture, as by filtration, and any acid remaining in the mixture is neutralized. On distillation, there is obtained a close-boiling mixture of the meta- and para-alkylphenol isomers. This mixture of isomers is valuable in itself, for example, for the preparation of resins; however, for many purposes it will be advantageous to process the mixture further to produce an alkylphenol product consisting largely or entirely of the meta isomer. It is a further object of this invention to provide a method for the separation of meta-alkylphenols from para-alkylphenols.

Because of the proximity of the boiling points of m- and p-alkylphenols, it is virtually impossible to separate isomeric mixtures thereof by fractional distillation. However, it has now been discovered that such mixtures can be reacted with aromatic hydrocarbons which contain at least one accessible nuclear hydrogen atom, to remove the para-substituted alkylphenols by selective dealkylation thereof to form the corresponding olefin and phenol. The phenol is readily separated from the meta-alkylphenol by fractional distillation; under the conditions under which this dealkylation reaction occurs, the olefin removed from the paraalkylphenol alkylates the aromatic hydrocarbon to form an alkylated hydrocarbon which, being of different boiling range than the alkylphenol, may be easily separated by fractional distillation. These alkylated aromatic hydrocarbon byproducts are of commercial value as solvents and intermediates and may be recovered for use and sale, or else may be cracked by means known in the art to recover the aromatic hydrocarbon and at the same time yield olefin which may be recycled to alkylation. The phenol produced by dealkylation may be recycled to alkylation to produce more meta-alkyl isomers. The residual meta-alkylphenol may, if desired, be further purified by repeated treatment as described above; to remove the last traces of para isomer when the m-alkylphenol is a solid at room temperature as in the case of m-tert-butylphenol, the product may be ultimately purified by crystallization from a suitable solvent such as n-hexane. Generally, however, the presently provided process, whereby alkylphenol cuts containing up to over 90% of the meta isomer are produced, yields products which are of technically useful grades in a single processing.

The present process for the separation of meta-alkylphenols and para-alkylphenols is carried out by contacting the mixture of isomers with an aromatic hydrocarbon containing at least one accessible nuclear hydrogen atom at from about 50° to 200° C., preferably from about 80° to about 130° C., in the presence of a strong acid and clay, preferably activated clay. Ordinarily, this process will conveniently be conducted at atmospheric pressure, though partial vacuum or superatmospheric pressures may be applied when desirable. It will be appreciated that, just as the process of this invetnion for the formation of meta-alkylphenol may be applied directly to the reaction mixture obtained on alkylation of phenol, so the present process for removal of para-alkylphenol from the resulting meta- and para-alkylphenol isomeric mixture may, it will be obvious, be applied more or less directly to the isomerization reaction products. Thus, for example, to a phenol alkylation product containing free unreacted phenol and prepared by alkylation of phenol with an olefin in the presence of a strong acid may be added activated clay and if necessary, additional acid, after which the temperature is raised to accomplish conversion of the alkylation product to a mixture of meta- and para-alkylphenol as described above. Then to the resulting reaction product, preferably after removal of unalkylated phenol, is added a readily alkylated aromatic hydrocarbon such as xylene; additional acid and clay are added if necessary, and the reaction mixture is then heated until dealkylation of the para-alkylphenol has occurred.

The mole ratio of the aromatic hydrocarbon to the para-alkylphenol may be as low as 1:1 or as high as 10:1; a 5:1 ratio is preferred. The aromatic hydrocarbon employed as a dealkylation reagent may be any aromatic hydrocarbon containing at least one accessible nuclear hydrogen atom. By an "accessible" nuclear hydrogen atom is here meant a hydrogen atom on the aromatic nucleus which is free of steric hindrance and thus susceptible to replacement by an alkyl group, as by contact with an olefin. Illustrative of such hydrocarbons are naphthalene, biphenyl, and the like. Preferably, the aromatic hydrocarbon is a readily alkylated monocyclic aromatic hydrocarbon containing at least one accessible nuclear hydrogen atom, as exemplified by tert-butylbenzene, isooctylbenzene and diethylbenzene. Particularly preferred are the class of monocyclic aromatic hydrocarbons containing as substituents from 0 to 2 methyl radicals and of relatively low boiling point, such as benzene, toluene or xylene.

Although 16%, by weight of the total alkylphenol charge, of clay is preferred, as little as 0.5% or as much as 30% may be used. The acid catalyst may be present in amount varying from 0.5 to 7% by weight of the total of alkylphenol, but about 2% is preferred; any strong acid catalyst such as the inorganic and organic acid catalysts listed above may be employed. The temperature at which the dealkylation is conducted may vary widely, ranging from about 50° to about 300° C., depending on the nature of the aromatic hydrocarbon, the required rate of dealkylation and so forth. For the aromatic hydrocarbons of choice in this connection, including benzene, toluene and xylene, the temperature of operation is preferably from 100° to 120° C.; very little conversion is encountered under 80° C., and above 130° C. the reaction is not further accelerated. Reaction time may vary from 2 to 10 hours depending on the alkylphenol employed. On completion of the reaction, separation of the meta-alkylphenol is effected by fractionation, as described above, desirably after removal of the clay and acid catalysts, by filtration and neutralization.

Alternatively or additionally, the presently provided mixtures of meta- and para-alkylphenols and other meta, para-alkylphenol isomeric mixtures may be separated by virtue of their differential solubility in dilute aqueous sodium hydroxide. I have discovered that separation of the meta- and para-alkylphenols may be conveniently accomplished by dissolving the crude isomeric mixture in dilute aqueous sodium hydroxide and subsequently adding additional alkali to the solution, whereby the sodium salt of the para-alkylphenol is selectively precipitated. The precipitated sodium p-alkylphenols may then be removed by simple filtration leaving the more soluble m-alkylphenol in the filtrate; both salts may be neutralized to recover the original alkylated phenols, and the recovered p-alkylphenol may be recycled in the conversion process to form more m-alkylphenol.

In this embodiment of the invention the isomeric m- and p-alkylphenol mixture is contacted with aqueous sodium hydroxide in a volume sufficient to dissolve both of the isomers. In this step, a solution containing from about 5 to about 15% of sodium hydroxide by weight may be employed. The sodium hydroxide content of the quantity of such aqueous solution added to the m- and p-alkylphenol mixture should be at least a molar equivalent of the total quantity of alkylphenol isomers present in the mixture. The quantity of sodium hydroxide added to cause the precipitation will generally be from 1 to 2 times that employed to dissolve the isomeric alkylphenol mixture. Optimum amounts can readily be determined by experimentation; care must be taken not to add so much sodium hydroxide as to cause precipitation of the meta-alkylphenol. The reaction mixture is then filtered, and the separated m- and p-alkylphenols isolated.

The invention is further illustrated but not limited by the following examples, in which quantities are expressed in parts by weight.

*Example 1*

This example illustrates the alkylation of phenol followed by conversion of the product to a meta-alkylphenol.

A mixture of 1982 parts of phenol with 250 parts of oven-dried activated clay ("Retrol," sold by Filtrol Corp., Los Angeles, Calif.) and 3.6 parts of concentrated sulphuric acid was placed in a reaction vessel equipped with a Dry Ice reflux condenser. To the mixture was charged 561 parts by weight of isobutylene, the addition of this quantity requiring 2 hours, during which the temperature of the reaction mixture was maintained at 71–87° C. This quantity of isobutylene was calculated to alkylate approximately one half of the phenol charged. After completion of addition of the isobutylene, the reaction mixture was held at 190° C. for 15 hours. The crude product was then filtered to remove the catalyst and fractionated, whereby there was obtained 906 parts by weight of a close-boiling crude meta- and para-tert-butylphenol mixture, containing 74.2% m-tert-butylphenol. This corresponds to a conversion of 44.8% calculated on the isobutylene.

*Example 2*

This example illustrates the preparation of m-isopropylphenol from the para isomer.

A mixture of 655 parts of p-isopropylphenol (M. 64–65° C.), 470 parts of phenol, 200 parts of the activated clay employed in Example 1 and 5.4 parts of fuming sulphuric acid was placed in a flask equipped with stirrer, reflux condenser and thermometer well and heated by a glass mantle. The mixture was heated, with stirring, at 179–181° C., cooled, filtered and fractionated. After separation of 83 parts of an alkylphenol boiling at 214° C., which was ortho-isopropylphenol (approximately 12.6% conversion of the original para isomer), there were obtained 325 parts of a m- and p-isopropylphenol mixture boiling at 223° to 230° C. and containing about 60% of the meta isomer, which corresponds to a conversion of approximately 30% of the para isomer to the meta.

*Example 3*

This and following examples illustrate the preparation of m-tert-butylphenol from p-tert-butylphenol.

A mixture of 974.5 parts of p-tert-butylphenol with 607 parts phenol (approximately a 1:1 molar ratio) was added to 100 parts of the oven-dried activated clay employed in Example 1 and 1.8 parts of concentrated sulphuric acid. The reaction mixture was heated for 24 hours at 140–160° C., filtered and fractionated, whereby there were obtained 745 parts of a m- and p-tert-butylphenol mixture boiling at 130–140° C./15–20 mm. This isomeric mixture contained approximately 76.9% of the meta isomer according to infra-red analysis, which is approximately 59% conversion of the para to the meta isomer.

*Example 4*

A mixture of 1451 parts of p-tert-butylphenol, 2823 parts of phenol (producing a mixture in the molar ratio of 1:2.8), 300 parts of the activated clay employed in Example 1, and 18 parts of concentrated sulphuric acid was heated at 180–183° C. for 4 hours. On fractionation, 1119.5 parts of a t-butylphenol m- and p-isomer mixture were obtained; this product contained 78.8% of the meta isomer, which represents a conversion of 60.4% calculated on the para-t-butylphenol charged.

*Example 5*

A mixture of 1950 parts of p-t-butylphenol and 1222 parts of phenol (producing about a 1:1 molar mixture) with 300 parts of the activated clay employed in Example 1 and 3 parts of fuming sulphuric acid was heated at 160–170° C. for 13 hours. There were obtained 1476 parts of a meta- and para-t-butylphenol mixture containing 72.7% of the meta isomer, which represents a conversion of 54.6% based on the para isomer charged.

Example 6

A mixture of 1502 parts of p-t-butylphenol with 2823 parts of phenol (producing a molar ratio of about 1:3), 49 parts of the activated clay employed in Example 1, and 0.15 part of concentrated sulphuric acid was heated at 180–187° C. for 19.5 hours. The reaction mixture was cooled to 90° C., filtered to remove the clay and fractionated. There were obtained 1262.2 parts of distillate boiling at 235–239° C. and analyzing for 74.6% meta-t-butylphenol, which is equivalent to 62.8% conversion.

Example 7

This example illustrates the production of the meta isomer with a strong acid catalyst other than sulphuric acid; in this case phosphoric acid is employed.

A mixture of 1502 parts of p-t-butylphenol, 941 parts phenol (about a 1:1 molar mixture), 150 parts of the activated clay employed in Example 1, and 2 parts of 86.7% phosphoric acid was heated at 160° C. for 9 hours. On fractionation, 1176 parts of crude t-butylphenol were obtained containing 49.4% of the meta isomer, which represents a conversion of 38.5%.

Example 8

This example illustrates the use of an organic strong acid for the isomerization.

A mixture of 1502 parts of p-t-butylphenol, 941 parts of phenol, 150 parts of the activated clay employed in Example 1, and 3 parts of methanesulphonic acid was digested at 180–193° C. for 4 hours. There were obtained 1103 parts of a close-boiling isomeric mixture of t-butylphenol containing 71% of the meta isomer, which represents a conversion of 52.1% of the para-t-butylphenol charged.

Example 9

This example illustrates the production of m-sec-amylphenol. A mixture of 1150 parts of p-sec-amylphenol, 940 parts of phenol, 300 parts of the activated clay employed in Example 1, and 3.6 parts of concentrated sulphuric acid was reacted for 9 hours at 180–185° C. On fractionation there was obtained a sec-amylphenol product boiling at 242–262° C. and containing 18.7% meta-sec-amylphenol according to infra-red analysis.

Example 10

This example illustrates the preparation of m-tert-amylphenol.

A mixture of 1642 parts of p-tert-amylphenol, 200 parts of the activated clay employed in Example 1, 1880 parts of phenol and 3.6 parts of concentrated sulphuric acid was heated for 18.5 hours at 160–175° C. On fractionation there were obtained 1274 parts of product containing 52% m-tert-amylphenol, which is equivalent to an approximately 40% conversion of the tert-amylphenol charged.

Example 11

When the above experiment was repeated, employing 1642 parts of p-tert-amylphenol and 941 parts of phenol, with 200 parts of the activated clay used in Example 1, and 5.4 parts concentrated sulphuric acid, the mixture being heated for 10 hours at 185–190° C., there were obtained 1210 parts of amylphenol, B. 245–250° C., and containing 39.5% of the meta-tert-amylphenol isomer.

Similarly, there were prepared m-tert-hexylphenol, B. 267° C./750 mm., and m-cyclohexylphenol, B. 130° C./10 mm.

From p-tert-octylphenol (obtained by alkylation of phenol with diisobutylene), the preponderant product was m-tert-butylphenol. Nonylphenol cracked into approximately 50% m-tert-amylphenol and other alkylphenols.

Example 12

This and following examples illustrate the separation of a meta-alkylphenol from the para-alkylphenol isomer by dealkylation of the para isomer.

To a mixture of 1500 parts of crude tert-butylphenol, containing 63.5% of the meta isomer, with 300 parts of the activated clay employed in Example 1 and 5.4 parts of concentrated sulphuric acid were added 1420 parts of benzene and the mixture was heated for 5 hours at 80° C. On fractionation the cut boiling at 234–242° C., amounting to 1116 parts, was found by analysis to contain 82.2% m-tert-butylphenol.

Example 13

A mixture of 2008 parts of a m- and p-tert-butylphenol mixture containing 78.9% of the meta-isomer with 1058 parts toluene, 200 parts of the activated clay employed in Example 1 and 3.6 parts of concentrated sulphuric acid was heated at 110 to 112° C. for 5 hours. The reaction mixture was cooled and filtered to remove catalyst, and there was added thereto a solution of 5 parts of sodium hydroxide dissolved in 15 parts of water. Fractionation of the product yielded 1505 parts of tert-butylphenol, B. 135–139° C., containing 92.6% of the meta-isomer. An additional 77 parts of the meta-isomer appeared in the heads and residue of the fractional distillation, making an overall recovery of 1470 parts of m-tert-butylphenol or 92.6% recovery.

Example 14

A mixture of 1502 parts of p-tert-butylphenol, 2823 parts of phenol, 7.2 parts of sulphuric acid and 49 parts of the activated clay employed in Example 1 was heated for 20 hours at 185° C., yielding 1303.4 parts of a mixture of meta- and para-t-butylphenol.

To 750 parts of the crude mixture prepared as described above and containing 68% of the meta-tert-butylphenol isomer were added 678 parts of m-xylene (producing a 4:1 molar ratio of the aromatic hydrocarbon to the para-isomer present in the meta, para-isomer mixture), 150 parts of the activated clay employed in Example 1, and 1.8 parts concentrated sulphuric acid. This mixture was heated for 4 hours at 109° to 112° C., after which it was filtered to separate the catalyst, yielding 1324 parts of organic material to which was added 15 parts of a 50% aqueous solution of sodium hydroxide; the product was then distilled to yield 486 parts of t-butylphenol containing 83.6% of the meta-isomer.

Example 15

A mixture of 1502 parts of para-tert-butylphenol, 941 parts of phenol, 3 parts of concentrated sulphuric acid and 300 parts of the activated clay employed in Example 1, was heated for 4 hours, yielding 1108.5 parts of a meta, para-tert-butylphenol mixture containing 76% of the meta isomer.

To 750 parts of this meta, para isomer mixture was added 491 parts of p-xylene, 1.8 parts of concentrated sulphuric acid and 150 parts of the activated clay employed previously, after which the mixture was heated for 4 hours at 110° C. It was then filtered, neutralized and fractionated to yield 591 parts of a meta, para-tert-butylphenol mixture containing 84% of the meta isomer.

Example 16

This example illustrates the separation of meta- and para-alkylphenol isomers by treatment with sodium hydroxide.

75 parts of a tert-butylphenol isomeric mixture containing 72.8% of the meta isomer and the remaining, para isomer, was dissolved in a solution of 20 parts of sodium hydroxide in 200 parts of water. Then an additional 30 parts of sodium hydroxide were added to the reaction mixture and the solution was cooled to 20° C., whereupon a precipitate of sodium p-tert-butylphenolate deposited. After separation from the filtrate, the precipitate was acidified, whereby 10 parts of p-tert-butylphenol, M. 95–96° C., were recovered. The filtrate from which the sodium p-tert-butylphenolate precipitate had been separated was acidified, washed and dried under vacuum, whereby there were recovered 61 parts of tert-butylphenol containing 85.2% of the meta isomer.

What is claimed is:

1. The method which comprises heating an alkylphenol wherein the alkyl radical is in a position selected from positions ortho and para to the hydroxy group of said phenol with phenol, the molar ratio of said phenol to said alkyl phenol being at least about 0.5:1, in the presence of a strong acid and a clay catalyst, at a temperature of at least about 125° C., and thereby forming a meta-alkylphenol.

2. A method which comprises heating an alkylphenol wherein the alkyl radical is in a position selected from positions ortho and para to the hydroxy group of said phenol and wherein the alkyl radical contains from 2 to 12 carbon atoms, together with phenol, the ratio of said phenol to said alkylphenol being at least about 0.5:1, with a strong acid and an activated clay catalyst at a temperature of at least about 125° C., and thereby producing a meta-alkylphenol.

3. The method of claim 2 wherein said alkyl radical is a tertiary-alkyl radical of up to 6 carbon atoms.

4. A process for catalytic isomerization, which comprises bringing a para-alkylphenol wherein the alkyl radical contains from 2 to 12 carbon atoms into contact with phenol, the ratio of said phenol to said alkylphenol being at least about 0.5:1, a strong acid and an activated clay catalyst, at a temperature of at least about 125° C., and thereby forming the corresponding meta-alkylphenol.

5. The process which comprises heating a close-boiling mixture of meta- and para-alkylphenols wherein the alkyl radical contains 2 to 12 carbon atoms, with a monocyclic aromatic hydrocarbon containing at least one accessible nuclear hydrogen atom in the presence of a strong acid and activated clay, at a temperature of from about 50° to about 200° C., and thereby effecting selective dealkylation of the para-alkylphenol.

6. The process which comprises heating a mixture of alkylphenol isomers containing at least some meta-alkylphenol isomer, wherein the alkyl radical contains from 2 to 12 carbon atoms, with a monocyclic aromatic hydrocarbon containing from 0 to 2 methyl substituents, in the presence of a strong acid and activated clay, at a temperature of from about 50° to about 200° C., and separating an alkylphenol fraction enriched in metal-alkylphenol.

7. The process which comprises heating a mixture of meta- and para-tert-alkylphenol isomers, wherein the alkyl radical contains up to 12 carbon atoms, with a monocyclic aromatic hydrocarbon comprising a benzene ring substituted by from 0 to 2 methyl substituents, the molar ratio of said hydrocarbon to said para-alkylphenol being from about 1:1 to about 10:1, in the presence of from about 0.5% to about 30% of activated clay and about 0.5 to about 7% of sulphuric acid, said percentages being calculated with respect to total weight of alkylphenol present, at between about 100° and 120° C., thereby effecting selective dealkylation of said para-tert-alkylphenol.

8. The process of claim 7, wherein said alkylphenol is tert-butylphenol, and said aromatic hydrocarbon is xylene.

9. The process which comprises contacting a para-alkylphenol wherein the alkyl radical contains from 2 to 12 carbon atoms with phenol in the presence of a strong acid and activated clay, at a temperature of at least about 125° C., thereby forming a mixture of meta- and para-alkylphenol isomers; heating said mixture of isomers with an aromatic hydrocarbon in the presence of a strong acid and activated clay, at a temperature of from about 50° to about 200° C.; and isolating by fractionation an isomeric alkylphenol mixture containing a higher proportion of the meta isomer than said first-formed mixture of meta- and para-alkylphenol isomers.

10. The method of claim 9 wherein the alkyl radical is a tert-alkyl radical, and the aromatic hydrocarbon is a monocyclic hydrocarbon containing from 0 to 2 methyl substituents.

11. The process of preparing m-tert-butylphenol which comprises contacting p-tert-butylphenol with phenol, in a molar ratio of from 1:0.5 to 1:3, respectively, in the presence of sulphuric acid and activated clay, at a temperature of at least about 125° C., to effect conversion of a portion of said p-tert-butylphenol to m-tert-butylphenol; heating the resulting mixture of meta and para isomers with a monocyclic aromatic hydrocarbon containing from 0 to 2 methyl substituents, in amount such that the molar ratio of said aromatic hydrocarbon to the para isomer in said mixture of isomers is from about 1:1 to about 10:1, in the presence of dealkylation catalysts comprising about 2% of sulphuric acid and about 16% of activated clay, said percentages being calculated by weight with respect to total weight of alkylphenol present, at a temperature of from about 50° to about 200° C.; removing said dealkylation catalysts, and separating by fractional distillation a fraction rich in m-tert-butylphenol.

References Cited in the file of this patent

UNITED STATES PATENTS

| | | |
|---|---|---|
| 1,972,599 | Perkins et al. | Sept. 4, 1934 |
| 2,193,760 | Dreisbach et al. | Mar. 12, 1940 |
| 2,337,123 | Olin et al. | Dec. 21, 1943 |
| 2,676,191 | Hoatson et al. | Apr. 20, 1954 |
| 2,678,337 | Good et al. | May 11, 1954 |

FOREIGN PATENTS

| | | |
|---|---|---|
| 695,464 | Great Britain | Aug. 12, 1953 |